No. 695,550. Patented Mar. 18, 1902.
H. HART.
FARE REGISTER.
(Application filed Apr. 1, 1899.)
(No Model.) 6 Sheets—Sheet 1.

Fig. 1.

Witnesses  Henry Hart Inventor
By his Attorneys,

No. 695,550. Patented Mar. 18, 1902.
H. HART.
FARE REGISTER.
(Application filed Apr. 1, 1899.)
(No Model.) 6 Sheets—Sheet 3.

Witnesses Henry Hart, Inventor
By his Attorneys,

United States Patent Office.

HENRY HART, OF QUINCY, ILLINOIS.

FARE-REGISTER.

SPECIFICATION forming part of Letters Patent No. 695,550, dated March 18, 1902.

Application filed April 1, 1899. Serial No. 711,345. (No model.)

*To all whom it may concern:*

Be it known that I, HENRY HART, a citizen of the United States, residing at Quincy, in the county of Adams and State of Illinois, have invented a new and useful Combined Fare Indicator and Recorder, of which the following is a specification.

My invention relates to combined indicators and recorders, and has for its object to provide a combination of devices adapted for indicating stations or stopping-points successively, for indicating the number of passengers occupying a vehicle, such as a car or coach, between two stations or stopping-points, and for recording the names of the stations or stopping-points with the indicated number of passengers to produce a permanent record, the operation of the mechanism being under the control of the conductor or fare-collector and the construction thereof being such as to prevent fraudulent manipulation, and thus insure the proper report of fares, whether in the form of cash, mileage, tickets, or passes, to the auditor of the transportation company.

Further objects and advantages of this invention will appear in the following description, and the novel features thereof will be particularly pointed out in the appended claims.

In the drawings, Fig. 7 is a detail sectional view of the station-indicating drums.

Similar reference characters indicate corresponding parts in all the figures of the drawings.

Figure 1:
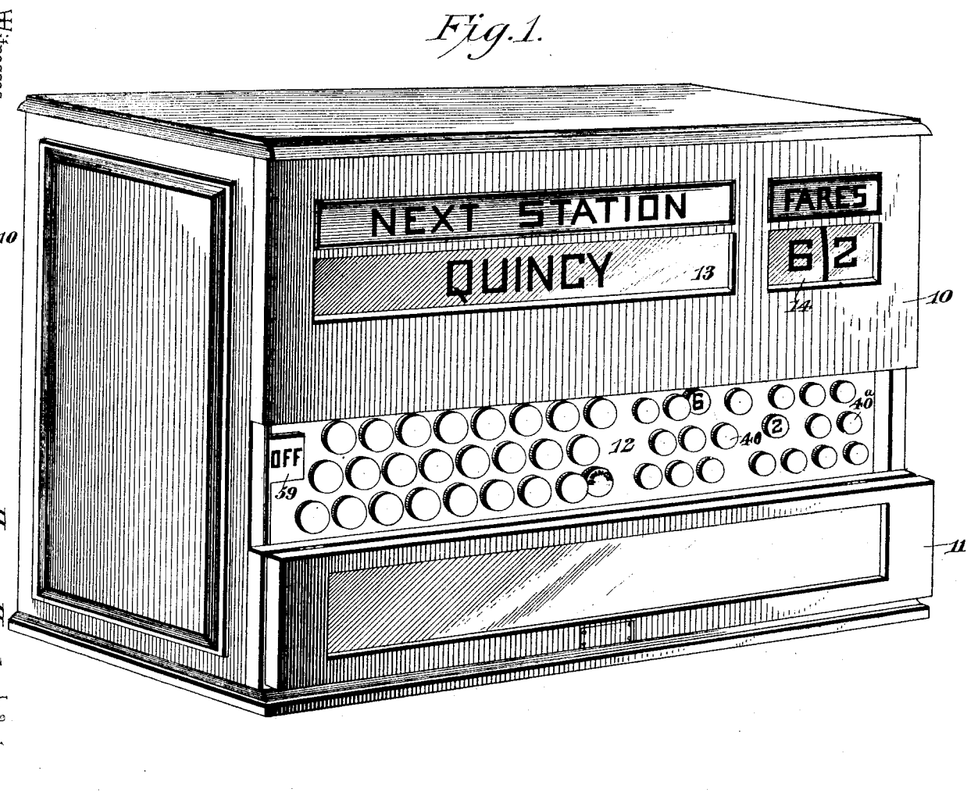
Figure 1 is a perspective view of a device constructed in accordance with my invention, showing the casing exteriorly to indicate the general appearance thereof as viewed by the passengers of the vehicle.
Figure 2:
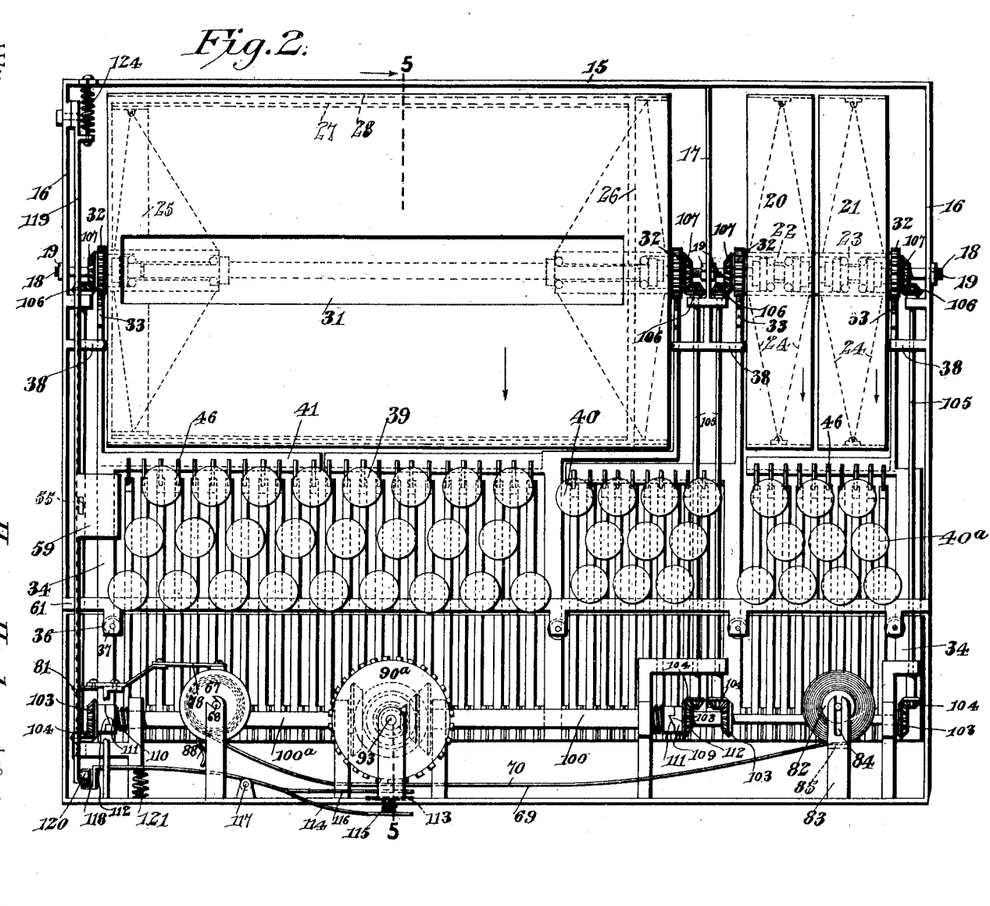
Fig. 2 is a front view, partly in section, of the mechanism with the casing omitted.
Figures 3, 8, 9, 10:
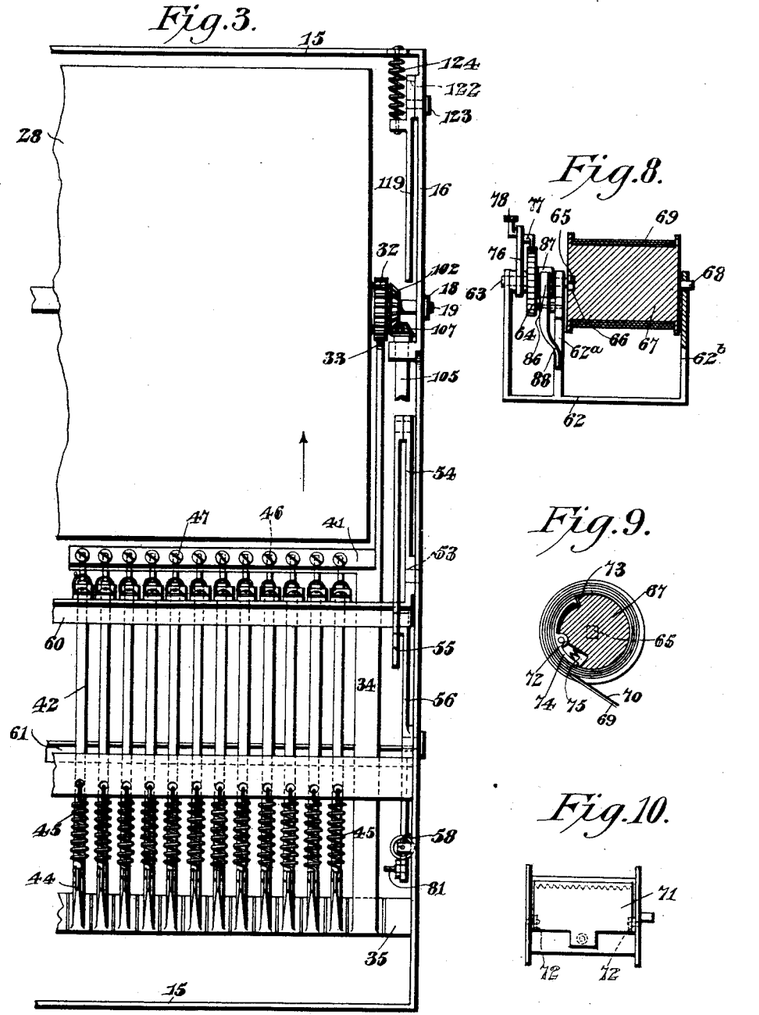
Fig. 3 is a rear view of a portion of the same.
Fig. 8 is a detail side view, partly in section, of the paper receiving or feed roll and the means whereby motion is communicated thereto.
Fig. 9 is a sectional view of the paper receiving or feed roll to show the means whereby the end of the paper web or strip is attached thereto.
Fig. 10 is a detail plan view of the feed-roll and paper-clamp.

In the illustrated embodiment of my invention the casing 10 is constructed of any suitable shape and dimensions, preferably with a drop-door or flap 11, by which the keyboard 12 may be normally concealed, and also provided with inspection-openings 13 and 14, above which are placed characters designating, respectively, the next station or stopping-point and fares. In the construction illustrated said openings are respectively designated by the words "Next station" and "Fares."

The mechanism constituting the combined indicator and register is mounted in a frame 15, having side uprights 16 and an intermediate hanger 17, said hanger and uprights being provided with alined openings, in which is fitted a shaft or spindle 18, held in place by suitable terminal and intermediate nuts 19. Mounted upon the portion of the spindle between the hanger 17 and one of the side uprights are independently-movable fare-drums 20 and 21, consisting of transversely flat rims, bearing characters representing a number of fares—as, for instance, the numerals "0" to "9," inclusive—hubs 22 and 23, fitted upon the spindle, and spokes 24, connecting the rims, respectively, with the hubs, the hubs preferably having antifriction-bearings upon the spindle to reduce to the minimum the resistance encountered in operating the same; also mounted upon the other portion of the spindle 18 is a plurality of coaxial station-drums 25 and 26, of which the rims or shells 27 and 28 are of such relative diameters that the former fits within the latter, the hubs 29 and 30 being mounted by means of antifriction-bearings upon the spindle, as above described in connection with the drums 20 and 21. The outer station-drum 26 or that having the rim or shell of larger diameter is provided with a longitudinal auxiliary inspection-opening 31 for registration with the inspection-opening 13 in the front of the casing, whereby when the outer drum is at rest in the said position the inner drum may be turned to expose the names of stations or stopping-points upon its surface through the registering inspection-openings 31 and 13, and at the same time when desired the outer drum may be turned to expose other station or stopping-point names upon its surface. It will be understood, furthermore, that any desired number of coaxial, preferably concentric, drums may be arranged as described to provide the mechanism with the desired number of station or stopping-point names to suit the length of the route traversed by a vehicle in connection with which the register is employed.

Figures 4, 11, 12:
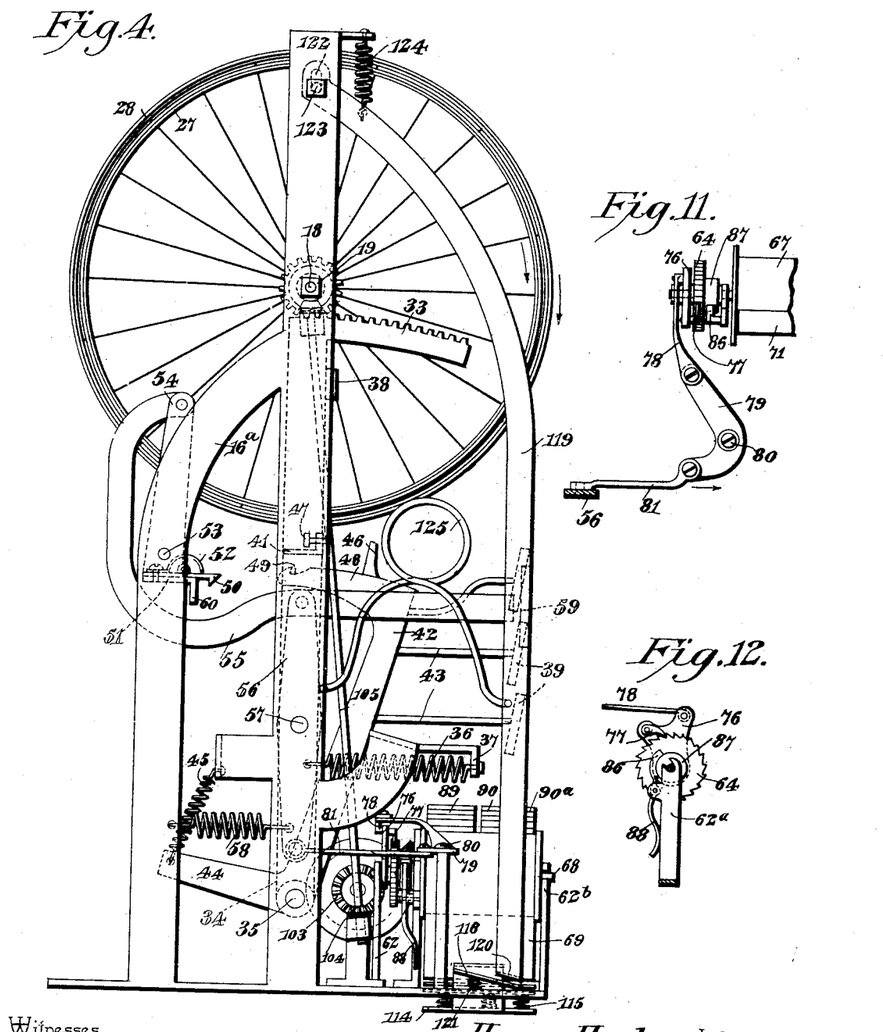
Fig. 4 is an end view of the mechanism.
Fig. 11 is a plan view of the paper-feeding devices.
Fig. 12 is a detail elevation of the means for communicating motion to the feed-roll.
Figure 4:
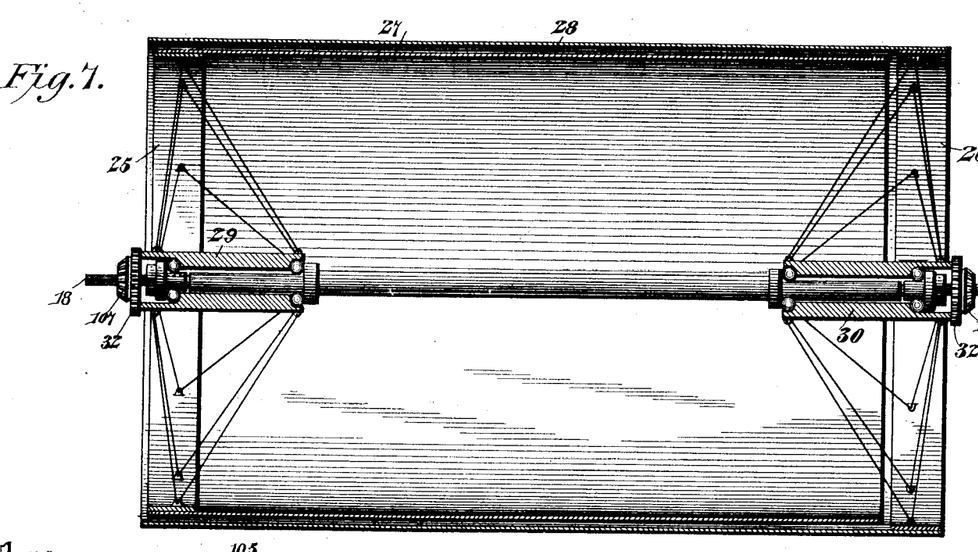
Figure 5:
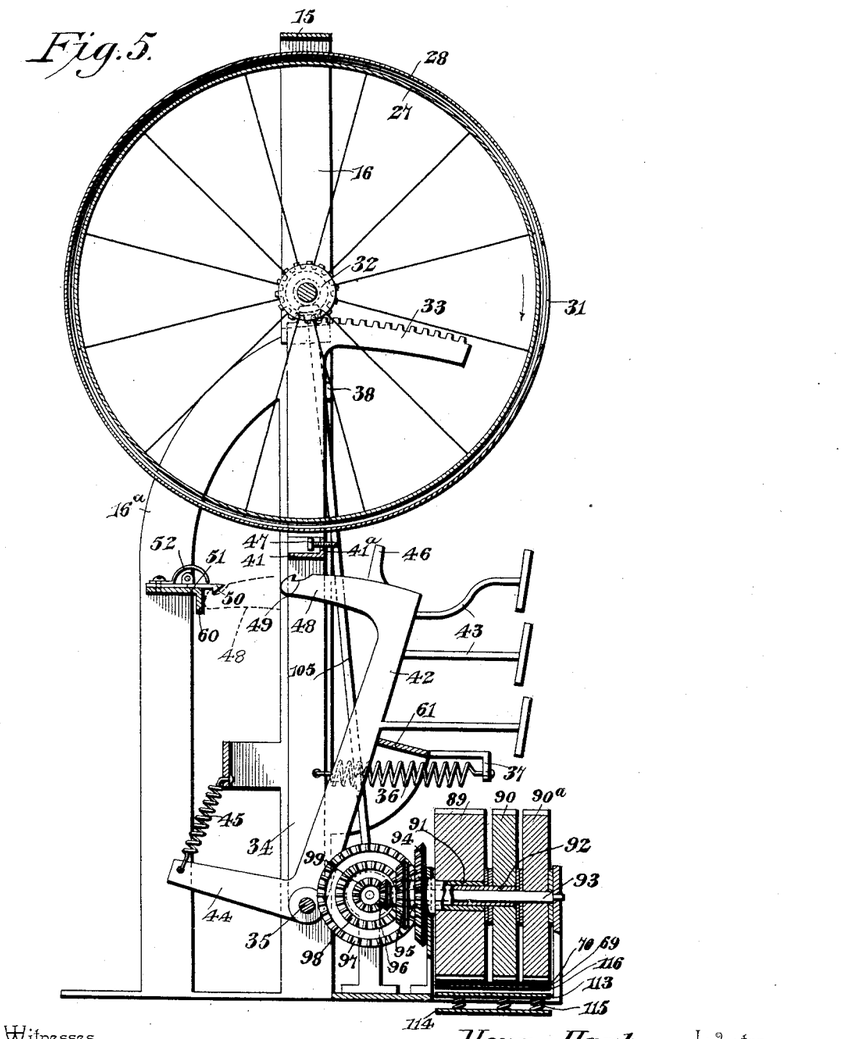
Fig. 5 is a vertical transverse section on the plane indicated by the line 5 5 of Fig. 2.
Figure 6:
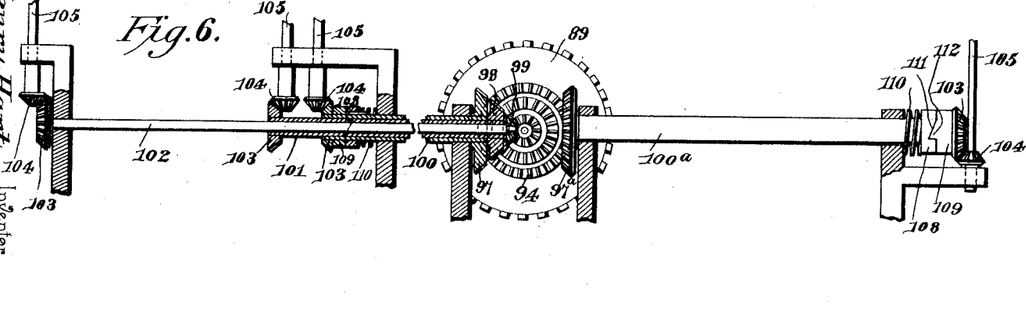
Fig. 6 is a detail longitudinal section of the means for communicating motion to the printing mechanism.

Carried by the hub of each of the drums 20, 21, 25, and 26 is a pinion 32, and meshing therewith is a reciprocatory rack 33, adapted when moved from its normal position, as indicated in Fig. 4, to impart rotary motion to the drum, and thus bring one or the other of the characters on the surface of said drum into view through one of the inspection-openings, according to the extent of rotation of the drum, and hence the extent of movement of the rack. Each rack is carried by a supporting-arm 34, mounted at its lower end upon a spindle 35, extending longitudinally of the casing and terminally secured to the frame-uprights 16; also, each rack-bar is yieldingly held in its normal position by means of a return-spring 36, connected with the supporting-arm 34 and preferably attached at its front end to a bracket 37, extending from and forming part of the frame. A stop 38, also projecting from the frame, is arranged in the path of forward movement of the supporting-arm 34 to limit such movement.

Mounted in the keyboard 12 are the station-drum-operating keys 39, the tens-drum-operating keys 40, and the units-drum-operating key 40ª, the functions of such keys being respectively to communicate motion to the several drums to indicate the stations successively which are being approached by the vehicle and the number of passengers occupying the vehicle or coach between the last stopping-point or station and that toward which it is progressing. Each drum-actuating element, consisting of a rack-bar 33 and its supporting-arm 34, is adapted to be operated by or receive motion from a plurality of keys, the motion imparted by each key to the drum-actuating element being through an interval different from that imparted to said actuating element by the other keys, and the means whereby motion is thus communicated to the drum-actuating element consists of a universal bar 41, carried by the supporting-arm 34 and arranged in the paths of key-levers 42, to which the shanks 43 of the keys are respectively attached. These key-levers are coaxially mounted upon the above-described spindle 35, thus being mounted coaxially with the supporting-arm 34, and each key-lever is provided with an extension or tail portion 44, to which is attached a return-spring 45, designed to return the key-levers and keys to their normal positions and to yieldingly maintain them in such normal positions. The particular means carried, respectively, by the key-levers and drum-actuating elements whereby motion is communicated from the former to the latter consist of lugs or ears 46 on the key-levers and adjustable pins 47, threaded in the upturned flange 41ª of the universal bar 41, it being obvious that said pins may be adjusted terminally toward and from the ears or lugs 46 to secure accuracy in the communication of motion from the key-levers to the drum-actuating elements to insure the suitable exposure of the different characters on the surfaces of the drums through the inspection-openings. As the drum-actuating elements are provided with return-springs 36 and the key-levers are correspondingly provided with return-springs 45, it is obvious that to retain the drum in position to expose the desired character thereof through an inspection-opening it is necessary to provide a locking device capable of operating automatically and securing the parts at the desired adjustment pending release to allow return to the described normal positions. Hence each key-lever is provided with a locking-arm 48, having a notch or shoulder 49 for engagement with a catch-dog 50, which is pivotally or yieldingly mounted upon a rocker 51. The catch-dog is yieldingly held in its normal position to engage the shoulder 49 of the locking-arm by means of a spring 52, and the rocker 51 is fulcrumed at 53 upon an auxiliary standard 16ª of the frame, said rocker being provided with a crank-arm 54, to which is connected a trip-arm 55. This trip-arm is fulcrumed at an intermediate point upon a rocking lever 56, fulcrumed at 57 and having attached to its lower arm a return-spring 58, whereby when the trip-arm is repressed by means, for instance, of a yielding release-key 59, arranged in the keyboard, the lever 56 will be tilted, the crank-arm 54 will be inclined to the rear upon the fulcrum 53, and the rocker 51 will be correspondingly actuated to lift the dogs 50 from engagement with the locking-arms 48. Obviously each bar 41 is universal to only those operating-keys 39, 40, and 40ª as are designed to operate that particular drum-actuating element by which it is carried; but the dog-carrying rocker 51 is preferably common to the entire series of operating devices, one dog being arranged in operative relation with each of the key-levers, and hence after the repression of one of the operating-keys 39, 40, and 40ª in each groove to indicate, respectively, the next station and the number of passengers occupying the vehicle between the last stopping-point and the station which the vehicle is approaching, each of said keys being locked in its repressed position, the actuation of the release-key 59 will tilt the rocker 51, and thus disengage all of the previously-repressed operating-keys and allow the elements of the apparatus to return to their normal positions under the influence of the return-springs with which they are severally provided. It will be understood that the lugs or ears 46 are arranged in different positions with relation to the paths of movement of the key-levers, whereby when a key-lever is moved to the rear until checked by a stop 60 (consisting of a depending flange of the rocker 51) and has been engaged by its coöperating dog 50 the drum-actuating element shall have been moved through a definite distance; but the movement of different key-levers causes a movement of the rack-bar through different intervals. In other words, the lugs or ears 46 are arranged at different distances from the common plane of the universal bar; but the extremities of the adjustable pins carried by said bar cause the movement of the drum-actuating element through different distances to bring different portions of its surface into view through the inspection-slot 13. The forward movement of the key-levers under the influence of the return-springs 45 is limited by a stop-bar 61, connecting the opposite side standards 16 of the frame, and, as illustrated, the brackets 37, to which the front ends of the return-springs 36 are attached, may extend forward from said stop-bar.

Secured to the bottom of the frame 15, preferably at a point near one end of the mechanism, is a bracket 62, having bearing-uprights 62ª and 62ᵇ, the spindle 63 of a ratchet-wheel 64 being mounted in bearings of the upright 62ª, and said spindle being provided at one end with a squared or angular terminal or head 65 for engagement with a squared or angular socket 66 in one end of a feed or receiving roll 67. A trunnion 68 at the opposite end of said roll is mounted in an open bearing in the upright 62ᵇ to adapt the roll to be displaced with facility for the attachment of a web or strip of paper or other recording or record-receiving medium 69. Parallel and coextensive with the record-receiving strip or medium is a transfer strip or ribbon 70, consisting of carbon-paper or the equivalent thereof, said transfer-strip preferably being arranged above the record-strip and being rolled at its extremity upon the feed or receiving roll, to which, with the record-strip, it is attached by means of a clamp 71. This clamp is countersunk in the surface of the feed-roll, to which it is pivotally attached by means of ears 72, and the free edge of the clamp may be serrated or otherwise roughened to engage the record and transfer strips and hold them properly in position in a longitudinal channel or groove 73, formed in the surface of the roll. At the opposite side of the fulcrum-point the clamp is extended to form a tongue 74, in connection with which is arranged a spring 75 to yieldingly hold the clamp in engagement with the strips.

Fulcrumed upon the spindle 63 of the ratchet-wheel 64 is a pawl-carrying arm or member 76, upon which is pivotally mounted a feed-pawl 77, and this oscillatory pawl-carrying arm or member is connected by a pull-rod 78 with one arm of a bell-crank lever 79, fulcrumed, as at 80. The other arm of the bell-crank lever is connected by a push-rod 81 with the lower arm of the rocking lever 56, whereby when the releasing-key is pressed to disengage the operating key-levers and said lever 56 is rocked upon its fulcrum 57 the bell-crank lever is moved in the direction indicated by the arrow in Fig. 11 to impart swinging movement to the pawl-carrying arm 76 and draw the pawl backward for engagement with a succeeding tooth of the ratchet-wheel, and upon the release of the key 59 the effect of the spring 58 in returning the rocking lever 56 to its normal position is to advance the pawl-carrier, and thus cause the movement of the feed-roll through one forward step to advance the record and transfer strips. The record and transfer strips are attached at the other end to a supply-roll 82, mounted in suitable bearings in the uprights of a bracket 83, said bearings being elongated and preferably consisting of slots 84, in which the trunnions of the roll are adapted for free vertical movement, the surface of the contents of the roll bearing upon a friction-bar 85, which extends between the standards of the bracket and is designed to cause sufficient friction to prevent the excessive forward movement of the supply-roll during the advance of the feed-roll. Excessive forward movement of the feed-roll and also backward movement thereof during the retraction of the feed-roll preparatory to engaging a succeeding tooth of the ratchet-wheel are prevented by a friction or brake device consisting of a brake-shoe 86, bearing upon the surface of a brake-roll 87, said brake-shoe being fulcrumed upon the bracket 62 and having a yielding or spring tongue 88, also bearing against the bracket at a suitable point to cause the necessary frictional pressure of the shoe upon said roll.

From the foregoing description it will be seen that in operation the repression of one of the operating-keys 39 will cause the exposure through the inspection-slot of the casing of the name of a station or stopping-point, and that the repression of one or more of the operating-keys 40 40ª will expose through the inspection-slot 14 a number which is designed to indicate the number of passengers occupying a coach or vehicle during the progress of said vehicle from the last station or stopping-point to that which is designated by the indicator, and also that each key after repression to the limit of its movement is engaged and held in such position to maintain the desired characters of the several indicating-drums in view through the inspection-slots, and also that after passing the station designated by the indicator the operation of the release-key 59 will disengage the several operating-keys and allow them to return to their normal positions and will actuate the feeding mechanism to advance the record ribbon or strip through an interval which may be termed "one step." This advance of the recording medium is designed to bring a fresh or uninscribed portion of its surface in operative relation with the inscribing member of a printing mechanism, also located within the casing of the registering apparatus, said record and transfer strips forming the other member of the printing mechanism. In the construction illustrated said inscribing member consists of a plurality of coaxial independently-movable type-carrying rolls 89, 90, and 90ª, which are respectively connected operatively with the indicating-drums 25 and 26, 20 and 21, the forward movement of either of the drums 25 and 26 being communicated by mechanism hereinafter described to the type-carrying roll 89, while the forward movement of the drums 20 and 21 will be communicated, respectively, to the type-carrying rolls 90 and 90ª. The type-carrying rolls are provided with concentric spindles 91, 92, and 93, suitably mounted in the frame and provided, respectively, with bevel-gears 94, 95, and 96. Meshing, respectively, with the said bevel-gears are other gears 97, 98, and 99, respectively, equal in diameter with the gears 94, 95, and 96 and carried by concentric spindles 100, 101, and 102. Also meshing with the gear 94 is a second gear 97ª, corresponding in diameter with the gear 97 and having a spindle 100ª, which extends in the opposite direction to the spindle 100.

Each of the spindles 100, 100ª, 101, and 102 is operatively connected with one of the indicating-drums, each being provided with a gear 103, meshing with a gear 104 on a spindle 105, which in turn carries a gear 106, meshing with a gear 107 on the hub of the drum. Preferably the relations between the diameters of the gears is such that a given movement of a drum will communicate an equal angular movement to the type-carrying roll, and hence for each complete revolution of a drum the connected type-roll will receive motion through one complete revolution. Owing to the fact, however, that the type-roll 89 is adapted for actuation by either of the drums 25 and 26 and as only one of these drums is adapted for operation at a time, it is necessary to provide a clutch connection between each drum 25 or 26 and the spindle 100ª or 100, which is actuated thereby. In the construction illustrated each of the spindles 100 and 100ª is connected with its gear 103 by means of a clutch, comprising a yielding clutch member 108 and a fixed clutch member 109, said clutch members having interlocking faces, and a spring 110, by which said interlocking faces are maintained in yielding engagement. The clutch member 108 is keyed to slide upon the spindle and is provided with a notch 111, having one wall beveled, and the clutch member 109 is fixed in position with relation to the gear 103 and is provided with a projection 112, having a beveled face. In operation the spindles 100 and 100ª respectively receive rotary movement in the direction indicated by the arrows applied to said spindles or in opposite directions, and thus by having the clutches of said spindles respectively arranged to engage in opposite directions or to communicate motion in opposite directions it will be seen that during the operation of the drum 25 the clutch of the spindle 100ª will communicate rotary motion thereto to actuate the roll 89, but that the motion received by the spindle 100 through the intermeshing gears 94 and 97 and being in the direction indicated by the arrow will allow the clutch member 108 of said spindle 100 to slip idly over the clutch member 109 without turning the gear 103, and hence without communicating motion to the drum 26. On the other hand, when the drum 26 is actuated motion will be communicated through the clutch of the spindle 100 to said spindle, and hence to the roll 89, and in turn the spindle 100ª will receive motion, but in a direction which will cause the member 108 of its clutch to slip idly over the member 109. Thus it will be seen that the motion of each drum is communicated independently of the other drums to one of the type-carrying rolls to advance the connected roll through an angular distance equal to that of the movement of the drum. Thus in operation for each movement of a drum a type-face of the connected type-roll is brought into operative position or to the printing-point, which is determined by a yielding platen 113, carried by a tilting lever 114, cushion-springs 115 being interposed between the lever and the platen, whereby when said lever is actuated to force the platen toward the type-rolls and upon the opposite side of the record and transfer strips from said rolls a yielding pressure is applied to the record-strip to cause the proper impress of the type located at the printing-point. To prevent excessive independent upward movement of the platen, the lever 114, which I will term the "printing-lever," may be provided with stop-arms 116.

At the opposite end from the platen the printing-lever (which is fulcrumed at an intermediate point, as shown at 117) is provided with a cam or incline 118, arranged in the path of an operating-arm 119, which is fulcrumed at its upper end upon the frame 15, said operating-arm having a foot 120 to traverse said cam or incline when the lower end of the operating-arm is moved toward the rear of the casing, and this operating-arm carries the release-key 59. The printing-lever is yieldingly held in its normal position by means of a return-spring 121, and in such position the cam 118 is in the path of rearward movement of the foot 120 to insure the proper tilting of the lever 114 when the operating-arm is actuated by pressure applied to the release-key 59. Said operating-arm, however, is provided with a sliding fulcrum, formed by slotting the arm, as shown at 122, for engagement with a fulcrum-pin 123, and connected with the arm to yieldingly hold it elevated to the limit of movement allowed by the slot 122 is a spring 124, connected at its upper end to the frame 15. Thus when the release-key is repressed to swing the lower end of the operating-arm rearwardly and depress the adjacent end of the printing-lever the platen is raised to force the record-strip and transfer-strip into operative relation with the type-rolls, and when the foot 120 passes beyond the cam 118, and thus releases the printing-lever for return movement by its spring 121, the operating-arm 119 is free to return to its normal position, and connected therewith to insure its return movement is a spring 125. Obviously this return or forward movement of the arm 119 causes the foot 120 to pass under the cam 118; but owing to the yielding fulcrum-point of the arm 119 a sufficient depression of the foot 120 is allowed to enable the latter to properly pass the cam, after which the operating-arm is elevated to its normal position by the spring 124.

From the foregoing description it will be obvious that the operation of the mechanism is substantially as follows: After leaving a station or stopping-point and collecting the fares the conductor or fare-collector should press one of the operating-keys of the station-indicating drums and the proper operating-keys of the fare-registering drums to indicate the next station or stopping-point and the number of passengers occupying the vehicle or coach. It will be understood that the object of the mechanism is not to register the number of fares collected, but the number of passengers occupying the vehicle between each station or stopping-point and the next, whereby at the end of the trip the recording medium may indicate, successively, the number of passengers occupying the coach throughout the different portions of the route. After passing the station indicated by the apparatus the conductor or fare-collector should repress the release-key 59 to release the operating key-levers previously actuated, and by so doing the printing mechanism is actuated by the tilting of the lever 114 to bring the platen into operative relation with the type-rolls, and thus record upon the strip 69 the name of the station just passed and the number corresponding with the number of passengers occupying the coach or vehicle when the latter reached said station, it being understood that the former operation of the keys 39, 40, and 40ª to expose the desired characters through the inspection-openings 13 and 14 has correspondingly adjusted the type-rolls to bring similar characters of said rolls to the printing-point. Also said operation of the release-key, in addition to disengaging the key-levers and making a permanent record of the number of passengers occupying the coach when the vehicle reached the last station, advances the record-strip to expose a new portion of the surface at the printing-point. After operating the release-key the conductor or fare-collector should then press another operating-key 39 and the proper keys 40 and 40ª to expose the name of the next station with the number of passengers remaining in the coach or vehicle when the latter left the last station. Thus at the end of the trip the record-strip will bear the successive impressions of the names of the different stations or stopping-points at which the vehicle has halted, with the number of passengers occupying the coach or vehicle when the latter reached said stations, respectively, and hence when the conductor or fare-collector makes his report to the auditor it is necessary to account for a number of passes, tickets, and other fares or mileage corresponding with the record, which shows the complete history of the trip. In other words, the apparatus embodying my invention is adapted to form a record of the trip from station to station, and thus by comparison with the fares will indicate whether each passenger has been entitled to transportation for the length of time or for the distance which he occupied the vehicle, the record forming a check on the actions of conductors in allowing passengers to travel greater distances than those called for by their fares, passes, or mileage. Furthermore, while I have illustrated a preferred embodiment of my invention it will be understood that various changes in the form, proportion, size, and minor details of construction within the scope of the appended claims may be resorted to without departing from the spirit or sacrificing any of the advantages of the invention.

Having described my invention, what I claim is—

1. In a device of the class described, the combination with indicating-drums and rotating means connected therewith, of keys for operating said rotating means to move the drums during the movement of the keys, said keys having different degrees of operative and lost motion with respect to the rotating means to operate the rotating means and to different extents and simultaneously move the drums through different distances, an automatic locking device for securing the drums and the keys in their adjusted positions, recording mechanism connected with the rotating means for operation by return movement thereof to record, releasing devices, and means for returning the drums and keys to their normal positions when released to actuate the recording mechanism.

2. In a device of the class described, the combination with indicating-drums, of drum-actuating devices yieldably held in their normal positions, key-levers, operating-keys for each drum connected with their respective levers, said levers having equal movement with respect to each other and having different degrees of effective and lost motion with respect to the drum-actuating devices, a rocker connected to all the levers, a separate locking device for each key-lever and having its members carried respectively by the rocker and the key-levers for holding the levers to hold the drums in their adjusted positions, means for actuating the rocker to release all the key-levers engaged therewith, and means for returning the drums.

3. In a device of the class described, the combination of indicating-drums, drum-actuating devices consisting of rack-bars meshing with pinions on said drums, and oscillatory supporting-arms carrying said rack-bars, return-springs connected with the supporting-arms, universal bars carried by the supporting-arms, key-levers and connected keys, said key-levers being provided with lugs or ears for engagement with the universal bars and having different degrees of effective and lost motion with respect thereto to move the supporting-arms through different distances, separate locking devices for securing the key-levers in their adjusted positions, and means for moving the locking devices simultaneously to release the key-levers simultaneously, substantially as described.

4. In a device of the class described, the combination of indicating-drums, drum-actuating devices consisting of rack-bars meshing with pinions on said drums, and oscillatory supporting-arms carrying said rack-bars, return-springs for the supporting-arms, universal bars carried by the supporting-arms, key-levers and connected keys, a fixed stop for limiting the movement of the key-levers, return-springs for the key-levers, said key-levers being provided with lugs or ears in the paths of which said universal bars are arranged, and the lugs or ears being normally arranged at different distances from the universal bars whereby the levers will have different degrees of effective and lost motion with respect to the universal bars to move them different distances and correspondingly move the drums, locking devices for securing the key-levers in their adjusted positions and releasing devices.

5. In a device of the class described, the combination of indicating-drums, drum-actuating devices consisting of rack-bars meshing with pinions on said drums, and oscillatory supporting-arms carrying said rack-bars, return-springs for the supporting-arms, universal bars carried by the supporting-arms, key-levers and connected keys, said key-levers having return-springs and being provided with lugs or ears in the paths of which said universal bars are arranged, and being spaced at different distances respectively from said universal bars, whereby the levers will have different degrees of effective and lost motion with respect to the universal bars to move them through different distances and correspondingly move the drums, a rocker having a stop arranged in the paths of movement of the key-levers, locking-dogs carried by said rocker for engaging the key-levers, and a release-key operatively connected with the rocker.

6. In a device of the class described, the combination of indicating members, key-actuated operating devices for advancing said indicating members, means for returning the indicating members to their normal positions, said means including a common release-key, recording mechanism comprising type-rolls operatively connected with their respective indicating members, a recording medium for receiving impressions from the type-rolls, a movable platen, a feeding device for the recording medium, a platen-carrying lever, cushion-springs interposed between the platen and said lever, and means actuated by the release-key for operating said feeding device and the platen-carrying lever.

7. In a device of the class described, the combination of indicating members, key-actuated operating devices for advancing said indicating members, locking means for holding said operating device with the indicating members advanced, said means comprising an element common to the indicating members, means for returning the indicating members to their normal positions, said means including a common release-key, a recording mechanism comprising type-rolls operatively connected respectively with said indicating members, a recording medium, a platen for advancing the recording medium into operative relation with the type-rolls, a platen-operating lever having a cam-face, and an operating-arm actuated by said release-key for operating the platen-carrying lever and arranged in operative relation with said cam-face.

8. In a device of the class described, the combination of indicating members, key-actuated operating devices for advancing said indicating members, locking means for holding said operating device with the indicating members advanced, said means comprising an element common to the indicating members, means for returning the indicating members to their normal positions, said means including a common release-key, a recording mechanism comprising type-rolls operatively connected respectively with said indicating members, a recording medium, a platen for advancing the recording medium into operative relation with the type-rolls, a platen-operating lever having a cam-face, and a yielding operating-arm carrying a release-key, and having a foot, in the path of advance movement of which said cam-face is arranged.

9. In a device of the class described, the combination of indicating members, key-actuated operating devices for advancing said indicating members, individual locking devices for the keys holding said operating device with the indicating members advanced, said means comprising an element common to the indicating members, means for returning the indicating members to their normal positions, said means including a common release-key, a recording mechanism comprising type-rolls operatively connected respectively with said indicating members, a recording medium and means for feeding the same, a printing-lever, and an operating-arm actuated by said release-key and having a releasing connection with the printing-lever, to communicate motion thereto when the operating-arm is moved in one direction.

10. In a device of the class described, the combination of indicating members, key-actuated operating devices for advancing said indicating members, locking means for holding said operating device with the indicating members advanced, said means comprising an element common to the indicating members, means for returning the indicating members to their normal positions, said means including a common release-key, a recording mechanism comprising type-rolls operatively connected respectively with said indicating members, a recording medium and means for feeding the same, a printing-lever having a cam-face, an operating-arm actuated by said release-key and arranged in operative relation with said cam of the printing-lever, said operating-arm having a movable fulcrum-point, and a spring for yieldingly maintaining said operating-arm in operative relation with said cam-face.

11. In a device of the class described, the combination of indicating members, key-actuated operating devices for advancing said indicating members, locking means for holding said operating device with the indicating members advanced, said means comprising an element common to the indicating members, means for returning the indicating members to their normal positions, said means including a common release-key, a recording mechanism comprising type-rolls operatively connected respectively with said indicating members, a recording medium and means for feeding the same, a printing-lever having a cam-face and a return-spring, and an operating-arm actuated by said release-key and provided with a foot to traverse said cam-face and adapted to yield in the direction of operative movement of the cam-carrying end of the printing-lever.

12. In a device of the class described, the combination of indicating members, key-actuated operating devices for advancing said indicating members, locking means for holding said operating devices with the indicating members advanced, said means comprising an element common to the indicating members, means for returning the indicating members to their normal positions, said means including a common release-key, a recording mechanism comprising inscribing and recording mediums, the former of which is operatively connected with said indicating members, a feeding device for the recording medium including a feed-roll, pawl-and-ratchet roll-operating means, a rocking lever actuated by said releasing-key, and connections between the rocking lever and said pawl.

13. In a device of the class described, the combination of indicating members, key-actuated operating devices for advancing said indicating members, locking means for holding said operating device with the indicating members advanced, said means comprising an element common to the indicating members, means for returning the indicating members to their normal positions, said means including a common release-key, a recording mechanism comprising inscribing and recording mediums, the former of which is operatively connected with said indicating members, a feeding device for the recording medium having a roll, roll-feeding ratchet mechanism, brake devices for preventing excessive movement of the roll, and means actuated by the release-key for operating said ratchet mechanism.

14. In a device of the class described, the combination of telescoped station-indicating drums, and tens and units, fare-indicating drums, the exterior station-indicating drum being slotted to form an inspection-opening, operating-keys and connections for communicating rotary motion in one direction respectively to the drums, locking devices comprising a common element, for maintaining the drums in their adjusted positions, a release-key connected with said common element, recording mechanism having type-rolls, a recording medium, and means for bringing the recording medium into operative relation with the type-rolls, and connections between the type-rolls and their respective drums, the same including gears connected respectively with the type-rolls, telescoped spindles having gears meshing with those of the type-rolls, and means for communicating rotary motion from the drums, respectively, to said type-rolls.

15. In a device of the class described, the combination of telescoped station-indicating drums, and tens and units, fare-indicating drums, the exterior station-indicating drum being slotted to form an inspection-opening, operating-keys and connections for communicating rotary motion in one direction respectively to the drums, locking devices comprising a common element for maintaining the drums in their adjusted positions, a release-key connected with said common element for releasing the drums, recording mechanism having a plurality of type-rolls provided with telescoped spindles bearing bevel-gears, a recording medium, and means for arranging the recording medium in operative relation with the type-rolls, oppositely-extending spindles 100, $100^a$ having gears meshing with the gear of one of the type-rolls, connections between the station-indicating drums and said oppositely-extending spindles and including clutches for allowing independent rotation of said spindles, and other spindles operatively connected with said fare-indicating drums and having gears meshing with those of the other type-rolls.

In testimony that I claim the foregoing as my own I have hereto affixed my signature in the presence of two witnesses.

HENRY HART.

Witnesses:
GEO. H. WILSON,
JOHN E. WALL.